(12) United States Patent
Chang

(10) Patent No.: US 7,079,197 B2
(45) Date of Patent: Jul. 18, 2006

(54) LIGHT SOURCE MODULE FOR COLLECTING REFLECTIVE BEAM FROM LIGHT SOURCE

(75) Inventor: Chong-Min Chang, Taipei (TW)

(73) Assignee: Benq Corporation, Taoyuan Shien (TW)

( * ) Notice: Subject to any disclaimer, the term of this patent is extended or adjusted under 35 U.S.C. 154(b) by 149 days.

(21) Appl. No.: 10/828,412

(22) Filed: Apr. 20, 2004

(65) Prior Publication Data
 US 2004/0207770 A1 Oct. 21, 2004

(30) Foreign Application Priority Data
 Apr. 21, 2003 (TW) ............................. 92109271 A

(51) Int. Cl.
 *G02F 1/1335* (2006.01)
(52) U.S. Cl. ............................. 349/5; 349/61; 359/322; 345/84; 362/608
(58) Field of Classification Search ............... 349/5, 349/61; 359/322; 345/84; 362/608
 See application file for complete search history.

(56) References Cited

U.S. PATENT DOCUMENTS

| 6,573,961 B1 * | 6/2003 | Jiang et al. | 349/115 |
| 6,805,450 B1 * | 10/2004 | Nishida et al. | 353/98 |
| 6,866,404 B1 * | 3/2005 | Yamauchi et al. | 362/299 |

FOREIGN PATENT DOCUMENTS

TW 338107 8/1998

* cited by examiner

*Primary Examiner*—Huyen Ngo
(74) *Attorney, Agent, or Firm*—Thomas, Kayden, Horstemeyer & Risley

(57) ABSTRACT

A light source module, applicable in a projection display system, comprises a light source, a light-selection device and a reflective device. The light source provides an incident beam. The light-selection device is arranged on a light path of the incident beam, for passing one part of the incident beam through and reflecting the other parts to be a reflective beam. The reflective device is arranged between the light source and the light-selection device, for reflecting the reflective beam back to and passing through the light-selection device.

11 Claims, 5 Drawing Sheets

LIGHT SOURCE MODULE FOR COLLECTING REFLECTIVE BEAM FROM LIGHT SOURCE

This application claims the benefit of Taiwan application Serial No. 092109271, filed Apr. 21, 2003, the subject matter of which is incorporated herein by reference.

BACKGROUND OF THE INVENTION

1. Field of the Invention

The invention relates in general to a light source module for collecting reflective beam from light source, and more particularly to a light source module for collecting reflective beam from light source applicable in a projection display system.

2. Description of the Related Art

Currently, either the liquid crystal display (LCD) technology, or digital light processor (DLP) technology (generally having one or three micro-mirror devices (DMD)) are commonly employed in the projection display system (projector).

FIG. 1 illustrates a schematic of a conventional projection display system using LCD as an imager. The projection display system 100 comprises a lamp 105, a reflector 110, a polarizer 115, the LCDs 120, 125 and 130, the separating dichroics 140, 145 and 150, the combining dichroics 160, 165 and 170, and a projection lens 180.

The lamp 105, such as metal halide bulb, tungsten halogen lamp or other arc discharge lamp, is coupled to the reflector 110. The reflector 110 focuses the light produced by the lamp 105 and turns it into an incident beam 107. The incident beam 107 passes through the reflective polarizer 115 (or polarizing beam splitter, PBS), which is an essential element to separate two orthogonally polarized light beams, and is separated into the lights of color red (R), green (G) and blue (B) by the separating dichroics 140, 145 and 150, respectively.

In the projection display system 100 of FIG. 1, three liquid crystal displays (LCDs) 120, 125 and 130 are used as the electro-optical light modulation panels (also known as imagers or light valves) for color red (R), green (G) and blue (B). The red (R), green (G) and blue (B) homogeneous light then pass through the LCDs 120, 125 and 130, and impinge on the combining dichroics 160, 165 and 170, respectively. Finally, composite light consisting of the red, green and blue homogeneous light impinges on a projection lens 180, and is magnified and projected on the screen 190. The liquid crystal display has individually addressable cells, which become individually controllable picture elements or pixels in the display environment.

Although the projection display system 100 described above comprises three LCDs, it is possible to have a projection display system comprising only one light modulation panel (one LCD-panel or one DMD-panel), monochrome or color. The image projection theories of both are similar. A projection display system comprising only one light modulation panel, for example, has a light source (comprising a lamp and a reflector) to produce an incident beam to enter a surface of a polarizer. The polarizer allows the incident light with particular polarization to exit from the other surface of the polarizer. Then, the incident light with particular polarization passes through the light modulation panel having red (R), green (G) and blue (B) filters, and impinges on a projection lens. The image is consequently magnified and projected on the screen.

FIG. 2 illustrates a schematic of another conventional projection display system using digital micro-mirror device (DMD) as an imager. The projection display system 200 comprises a lamp 205, a reflector 210, a color wheel 215 and a digital micro-mirror device (DMD) 220.

The lamp 205 coupled to the reflector 210 illuminates the light. The reflector 210 focuses the light and turns it into an incident beam 207. The color wheel 215 functions similarly as the PBS, separating the incident beam 207 into the lights of color red (R), green (G) and blue (B). Please also refer to FIG. 2B, which is a front view of the color wheel of FIG. 2A. The color wheel 215 is a spinning red/green/blue color sequential disc producing millions of colors in the projected image. When the incident beam 207 impinges the red regions 2151 of the color wheel 215, the red light is allowed to pass through the color wheel 215 and reaches the DMD 220. But the green and blue lights are reflected by the red regions 2151 and cannot pass through the color wheel 215. Similarly, if the incident beam 207 impinges the green regions 2152 of the color wheel 215, only green light is allowed to pass through the color wheel 215, and the red and blue lights are reflected by the green regions 2152. The blue regions 2153 of the color wheel 215 only allow the blue light of three colors to pass through.

In the projection display system 200 of FIG. 2, a digital micro-mirror device (DMD) 220 is used as the imager. The digital micro-mirror device (DMD) 220, also known as the Deformable Mirror Device, comprises numerous mirrors (not shown). Each mirror corresponds to a particular pixel of in the projected image and operates in a binary manner where each mirror cell switches between "ON" and "OFF". After the red (R), green (G) and blue (B) lights sequentially pass through the color wheel 215, the mirror deflection of the DMD 220 creates a full color image on the screen 290.

One problem with the projection display system 100 in FIG. 1 is that only the incident light with particular polarization is allowed to pass through the reflective polarizer 115, the other incident light without particular polarization is reflected and turns in a reflective beam 109. Reflection typically accounts for a loss of 50% of the incident beam 107. The projection display system 200 in FIG. 2 also has the problem of light inefficiency. Since only one of three colors can pass through the color wheel 215 at a time, the other two colors will be reflected and turns into the reflective beam 209; thus, reflection typically accounts for a loss of two-third of the incident beam 207.

Therefore, the conventional projection display systems 100 and 200 suffer from the considerable loss of light. For example, the loss of the projection display system 100 having LCD-imager is about 50%, and the projection display system 200 having DMD-imager is 66%. Such the disadvantage will cause the low light efficiency for projection display system.

SUMMARY OF THE INVENTION

It is therefore an object of the invention to provide a light source module for collecting reflective beam from light source, so as to enhance the light efficiency of the projection display system and to create a full color image of high quality on the screen.

The invention achieves the objects by providing a light source module applicable in a projection display system. The light source module comprises a light source, a light-selection device and a reflective device. The light source provides an incident beam. The light-selection device is arranged on a light path of the incident beam, for passing one part of the incident beam through and reflecting the other parts to be a reflective beam. The reflective device is arranged between the light source and the light-selection device, for reflecting the reflective beam back to and passing through the light-selection device. The light source comprises a lamp for providing light, and a reflector coupled to the lamp for focusing light to be the incident beam. The reflective device could be a reflective mirror having a reflective concave surface for bending back the reflective beam. The light-selection device may be a reflective polarizer in case the imager is an LCD panel and may be a color wheel in case the imager is a DMD.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
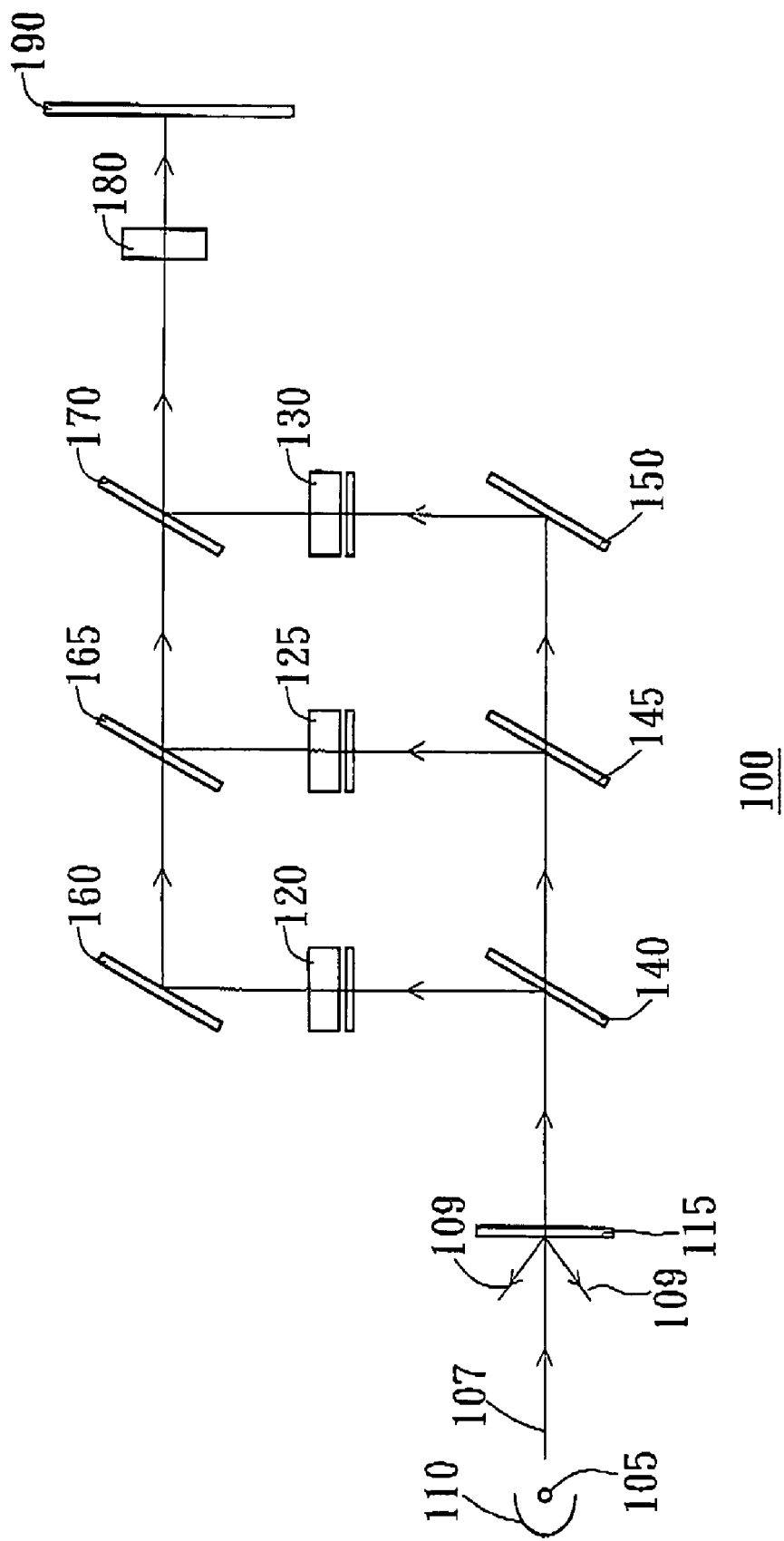
FIG. 1 (prior art) illustrates a schematic of a conventional projection display system using LCD as an imager.
Figure 2A:
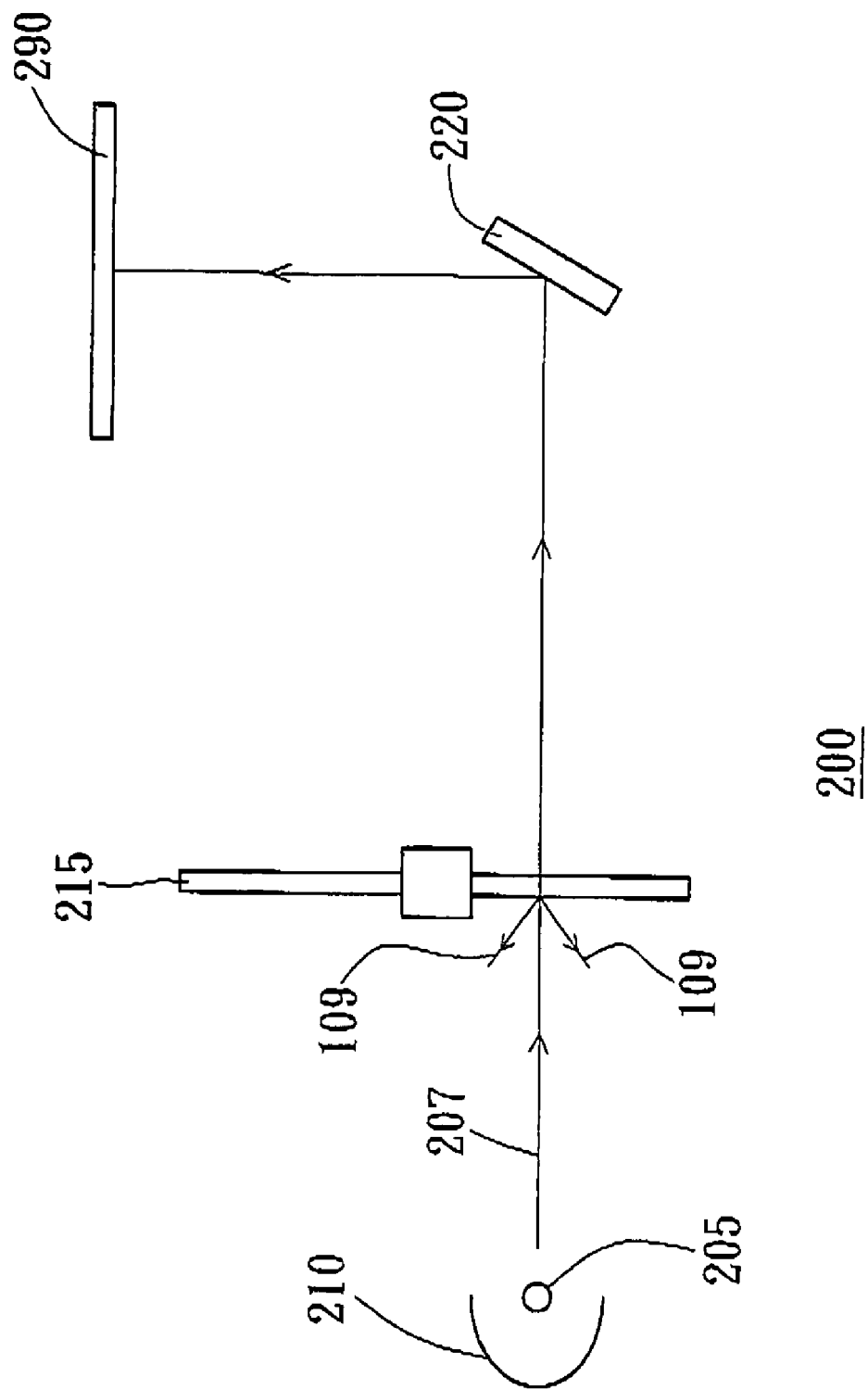
FIG. 2 (prior art) illustrates a schematic of another conventional projection display system using digital micro-mirror device (DMD) as an imager.
Figure 2B:
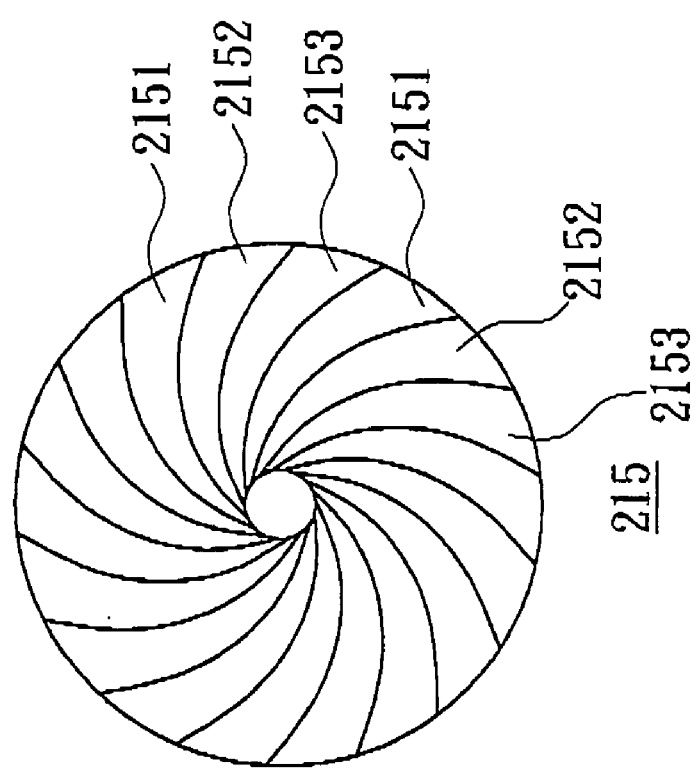
Figure 3:
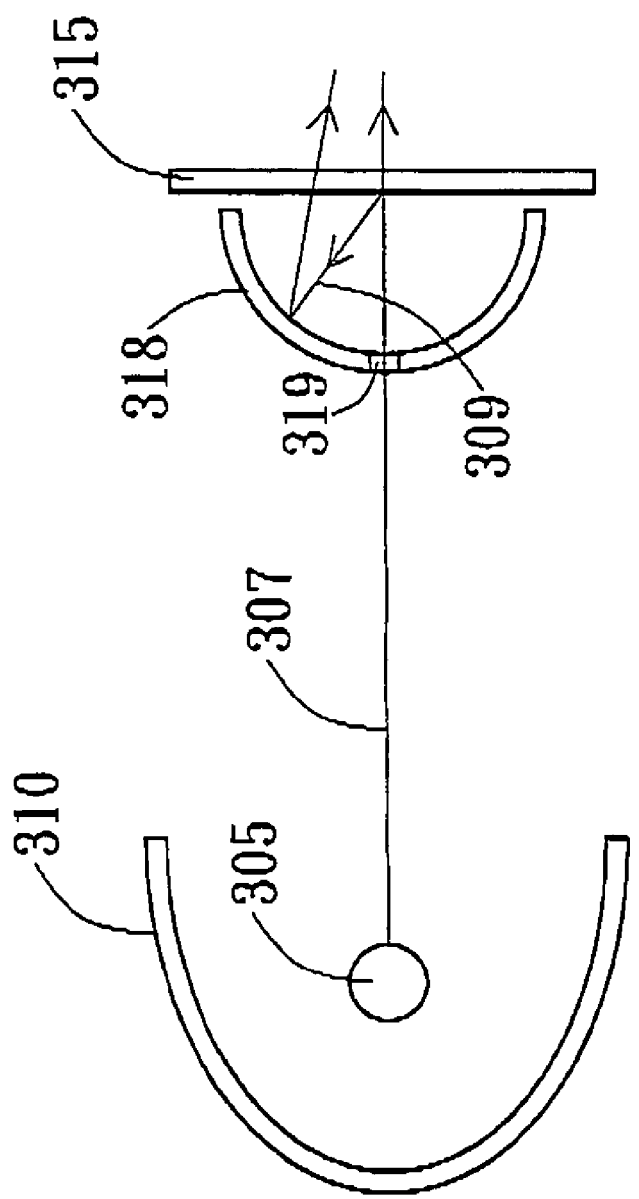
FIG. 3 illustrates a schematic of a light source module of a projection display system in accordance with the first embodiment of the invention wherein LCDs are used as the imagers.

FIG. 3 illustrates a schematic of a light source module of a projection display system in accordance with the first embodiment of the invention wherein LCDs are used as the imagers. The light source module 300 comprises: a light source including a lamp 305 and a reflector 310, a reflective polarizer 315 and a reflective mirror 318.

The light emitting from the lamp 305 is collected by the reflector 310. The reflector 310 focuses the light and turns it into an incident beam 307. The reflective polarizer 315 allows the incident light with the particular polarization, to exit from the other surface of the reflective polarizer 315. The other incident light without particular polarization is reflected and turns to be a reflective beam 309.

The reflective mirror 318 is arranged between the light source (including the lamp 305 and the reflector 310) and the reflective polarizer 315. Also, there is a transparent portion 319 in the center of the reflective mirror 318. By adjusting the position of the reflective mirror 318, the incident beam 307 can pass through the transparent portion 319 of the reflective mirror 318 so as to reach the reflective polarizer 315. A quarter-wave retardation foil 320 is attached to the reflective mirror 318. In a practical implementation, the quarter-wave retardation foil 320 consists of a carefully adjusted thickness of a birefringent material. The quarter-wave retardation foil 320 induces a relative phase shift of ☐/4 (a quarter wavelength) to convert linear polarized light into circularly polarized light and vice versa. Thus, the reflective beam 309 first passing through the quarter-wave retardation foil 320 is converted into circularly polarized light. After reflection by the reflective mirror 318, the reflective beam 309 is still circularly polarized, but with the opposite handedness. Then, the reflective beam 309 refl, second passing through quarter-wave retardation foil 320 is converted into linearly polarized light, and the directions of polarization is rotated through 90° simultaneously. In other words, the reflective beam 309 passes through quarter-wave retardation foil 320 twice, resulting in a 90° rotation of polarization. Consequently, the reflective beam 309 with changed polarization state is able to pass through the reflective polarizer 315 and be utilized by the projection display system.

According to the first embodiment described above, the reflective mirror 318 used with the reflective polarizer 315 as an isolator, blocking the light (reflective beam 309) reflected from the reflective polarizer 315. The loss of 50% of the incident beam 307 (reflective beam 309) is able to be redirected and pass through the reflective polarizer 315.

Figure 4:
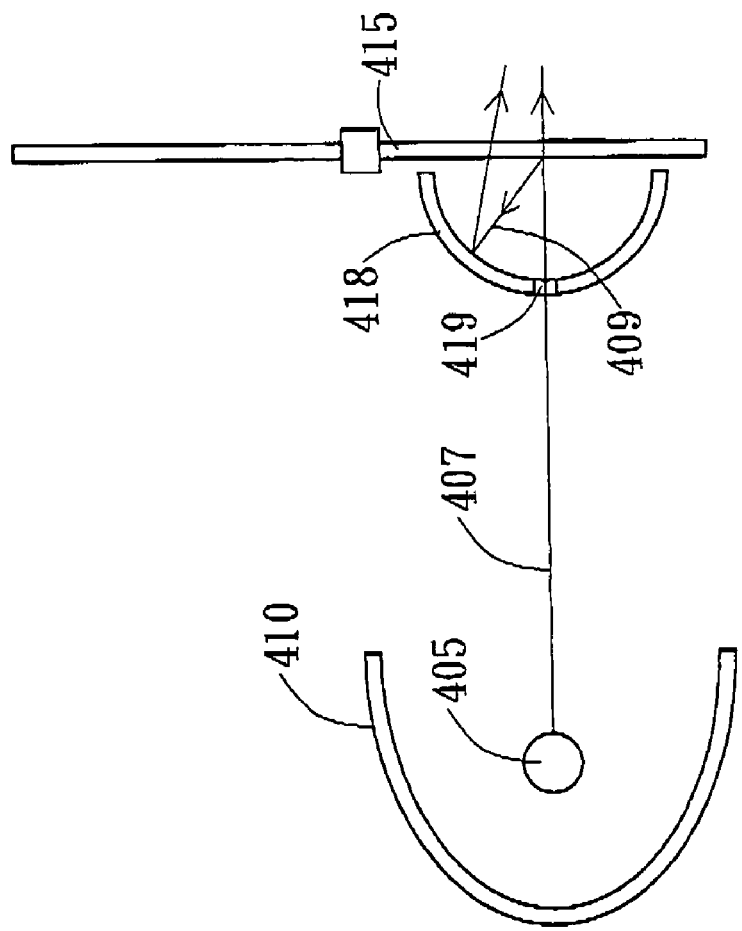
FIG. 4 illustrates a schematic of a light source module of a projection display system in accordance with the second embodiment of the invention wherein digital micro-mirror device (DMD) is used as an imager.

FIG. 4 illustrates a schematic of a light source module of a projection display system in accordance with the second embodiment of the invention wherein digital micro-mirror device (DMD) is used as an imager. The light source module 400 comprises: a light source including a lamp 405 and a reflector 410, a color wheel 415 and a reflective mirror 418.

In the projection display system with DMD, the color wheel 415 is arranged on the light path of the incident beam 407 (illuminated by the lamp 405 and focused by the reflector 410). Only one of three light colors (light R, G, B) is allowed to pass through the color wheel 415 at a time. The other two light colors are reflected by the color wheel 415, and thus turns into a reflective beam 409. This loss of light is about 66% (⅔). For enhancing the light efficiency of the display system, it is required to collect the reflective beam 409.

Similarly, the reflective mirror 418 having a transparent portion 419 in the center is arranged between the light source (including the lamp 405 and the reflector 410) and the color wheel 415. By adjusting the position of the reflective mirror 418, the incident beam 407 can pass through the transparent portion 419 of the reflective mirror 418 so as to reach the color wheel 415. The reflective mirror 318 is used for reflecting and shifting the illumination position of the reflective beam 409 on the color wheel 415. Then, the reflective beam 409 with changed illumination position on the color wheel 415 is able to pass through the color wheel 415 and be utilized by the projection display system.

The projection display systems as mentioned above, the light source modules of the embodiments do solve the problem of loss of reflective light. A reflective mirror is arranged between the light source and the light-selection device (polarizer or color wheel). By changing the polarization state and shifting the illumination position of the reflective beam, it can be recollected by the projection display system.

Thus, the projection display system applied with the light source module disclosed herein has much higher light efficiency than conventional display system.

While the invention has been described by way of examples and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light source module, applicable in a projection display system, comprising:

a light source, for providing an incident beam;

a light-selection device, arranged on a light path of the incident beam, for passing one part of the incident beam through and reflecting the other parts to be a reflective beam; and a reflective device, arranged between the light source and the light-selection device, and the reflective device having a transparent portion, wherein the incident beam pass through the transparent portion of the reflective device so as to reach the light-selection device, and the reflective beam is reflected by the reflective device and back to the light-selection device.

2. The light source module of claim 1, wherein the light source comprises:

a lamp for providing light; and a reflector, coupled to the lamp for focusing light to be the incident beam.

3. The light source module of claim 1, wherein the reflective device is a reflective mirror having a reflective concave surface for bending back the reflective beam.

4. The light source module of claim 1, wherein the light-selection device is a reflective polarizer.

5. The light source module of claim 1, wherein the light-selection device is a color wheel.

6. A light source module, applicable in a projection display system having a liquid crystal display (LCD) as an imager, comprising:

a light source, for providing an incident beam;

a reflective polarizer, arranged on a light path of the incident beam, for passing one part of the incident beam through and reflecting the other parts to be a reflective beam; and a reflective mirror, arranged between the light source and the reflective polarizer, the reflective mirror having a reflective concave surface and a transparent portion, wherein the incident beam pass through the transparent portion of the reflective mirror so as to reach the reflective polarizer, and the reflective concave surface is used for reflecting the reflective beam back to the reflective polarizer.

7. The light source module of claim 6, wherein the reflective mirror is attached by a quarter-wave retardation foil.

8. The quarter-wave retardation foil of claim 7, arranged between the reflective mirror and the reflective polarizer.

9. The light source module of claim 6, wherein the light source comprises:

a lamp for providing light; and a reflector, coupled to the lamp for focusing light to be the incident beam.

10. A light source module, applicable in a projection display system having a digital micro-minor device (DMD) as an imager, comprising:

a light source, for providing an incident beam;

a color wheel, arranged on a light path of the incident beam, for passing one part of the incident beam through and reflecting the other parts to be a reflective beam; and a reflective minor, arranged between the light source and the color wheel, and the reflective mirror having a reflective concave surface and a transparent portion, wherein the incident beam pass through the transparent portion of the reflective mirror so as to reach the color wheel, and the reflective concave surface is used for reflecting the reflective beam back to the color wheel.

11. The light source module of claim 10, wherein the light source comprises:

a lamp for illuminating light; and a reflector, coupled to the lamp for focusing light to be the incident beam.

* * * * *